UNITED STATES PATENT OFFICE.

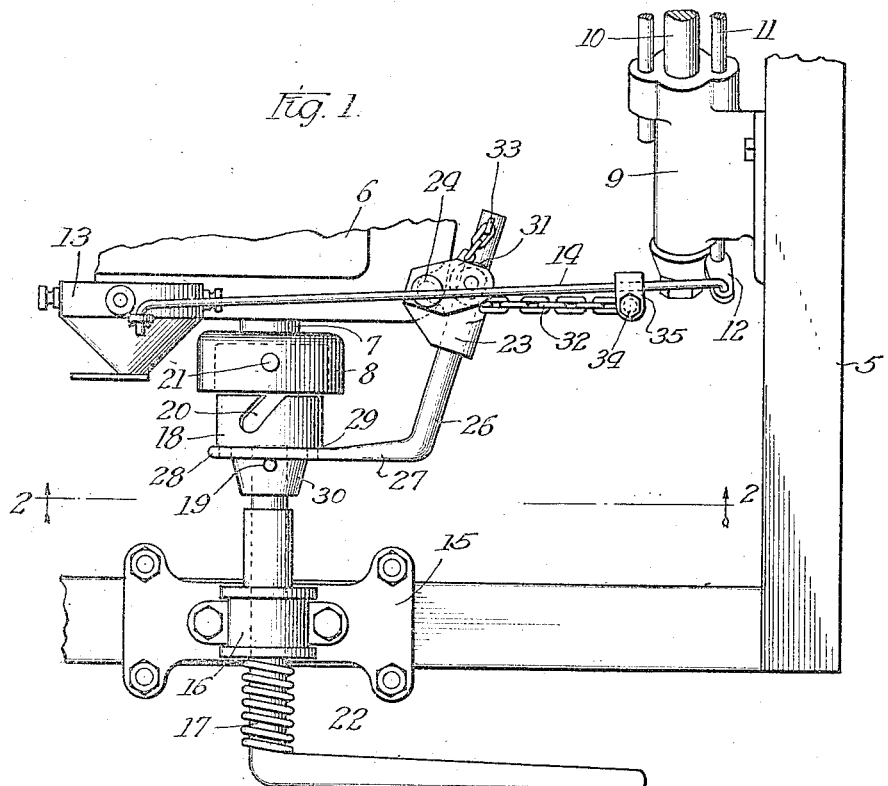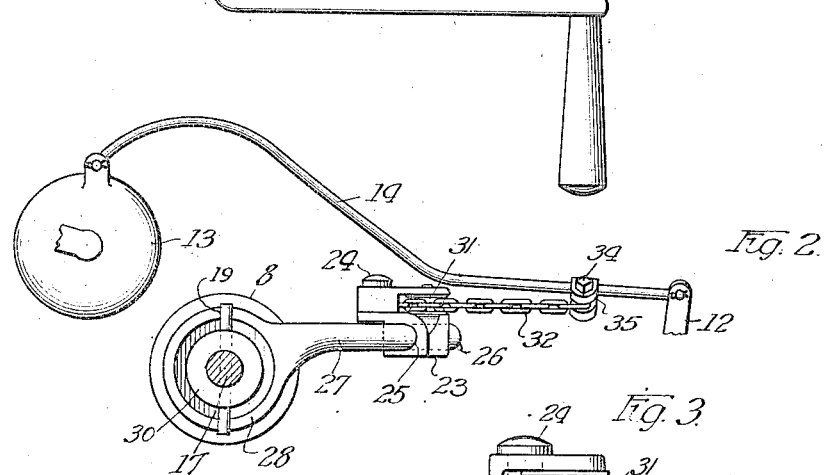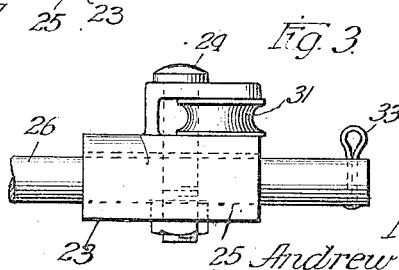

ANDREW P. HAWN, OF GOODLAND, INDIANA, ASSIGNOR TO THE H. & D. COMPANY, OF GOODLAND, INDIANA, A CORPORATION OF INDIANA.

AUTOMATIC SPARK-ADJUSTING ATTACHMENT.

1,222,399.     Specification of Letters Patent.    Patented Apr. 10, 1917.

Application filed December 9, 1916. Serial No. 135,935.

*To all whom it may concern:*

Be it known that I, ANDREW P. HAWN, a citizen of the United States, and a resident of Goodland, in the county of Newton and State of Indiana, have invented certain new and useful Improvements in Automatic Spark-Adjusting Attachments, of which the following is a specification.

My invention relates to an improved automatic spark adjusting attachment for motor vehicles for preventing accident during cranking of the vehicle.

If proper setting is not made in a vehicle of the sparking mechanism before the starting crank is turned, there is apt to be back firing in the cylinders and back kick of the crank, this happening usually when the spark is too far advanced. The object of my invention is therefore to provide improved means controlled by insertion of a crank into operative cranking position for making proper and safe setting of the sparking mechanism before the crank is turned to start the engine.

On the accompanying drawings I have shown my invention applied to a car of the Ford type although the invention is applicable to other types of cars. On the drawings Figure 1 is a plan view of sufficient parts at the front end of a car to show the application of my invention, Fig. 2 is a view from plane 2—2. Fig. 1, and Fig. 3 is a side elevational view of the attachment.

In Fig. 1, 5 represents the chassis frame, 6 the engine frame, 7 the crank shaft, 8 the crank handle receiving socket, 9 the bearing fitting for the lower end of the steering post 10 and also for the rod 11 connected at its upper end to the spark adjusting lever and at its lower end to a crank arm plug. 13 represents the timer connected by the link 14 with the end of the arm 12, the timer being shifted upon turning of the rod 11 to control the time of sparking in the engine cylinders.

A fitting 15 on the front of the frame 5 supports a bushing 16 in which is journaled the crank handle 17 to whose inner end is secured the ratchet head 18 by means of a pin 19. When the crank handle is pushed inwardly the diagonal ratchet slots 20 receive the ratchet pin 21 extending through the socket 8 and then when the crank is turned the crank shaft 7 will be rotated and the engine started. When the crank handle is released the spring 22 will tend to shift it outwardly to withdraw the head 18 from the socket 8, all this being the well known construction and arrangement in the Ford car.

Describing now my improved attachment, a block or fitting 23 is secured to the engine or other frame by a bolt 24 or otherwise. The block has a longitudinally extending passageway 25 for the reciprocation of a bar 26 whose front end 27 deflects laterally and terminates in a fork or ring 28 for receiving the head 18 of the crank handle. The head shown has the shoulder 29 and the reduced neck 30, and the ring 28 receives this neck and is confined thereon between the shoulder 29 and the pin 19 which has been lengthened for this purpose, that is, the ordinary pin is withdrawn and a longer pin substituted. Journaled on the block 23 is a pulley 31 and around this pulley passes a cord or chain 32 whose one end is connected to the pin 33 at the inner end of the bar 26, and whose other end is secured to the screw or bolt 34 which passes through the ends of the U-clamp 35, this U-clamp in its bend receiving the link 14 to be secured thereto.

With the above arrangement, when the crank handle is pushed inwardly to bring its head 18 into the socket 8 the bar 26 will be shifted through the block 23 and the chain will be drawn around the pulley. The length of the chain is such that under normal conditions the setting of the sparking apparatus will in no wise be interfered with, but if the setting just before cranking is too advanced and unsafe the chain will pull on the link 14 and will shift the time mechanism to a safe position. Thus it is impossible to crank the engine without first effecting automatic setting of the spark controlling mechanism to a safe position. After cranking of the engine and release of the crank handle the handle will be returned to its outer position by the spring 22 and this will again slack the chain 32 so that adjusting of the timer will not be interfered with during running of the vehicle.

I do not, of course, desire to be limited to the exact construction and arrangement shown and described as modifications are no doubt possible which would still come within the scope of the invention.

I claim as follows:

The combination with a gas engine and its spark timer, of a starting crank normally disconnected from the engine shaft but adapted to be shifted into connection therewith, a block, a pulley journaled on said block, a cord passing around said pulley and connected at one end with said timer, and a bar slidable through said block, said bar being connected at its inner end with the other end of said cord and being interposed at its outer end in the path of said crank to be shifted thereby when the crank is brought into connection with the engine shaft, such shifting causing shifting of the cord and operation of the spark timer to a safe position to prevent back-firing of the engine when the crank is turned to start the engine.

In witness whereof I hereunto subscribe my name this 6th day of December, A. D., 1916.

ANDREW P. HAWN.